United States Patent
Rudolph et al.

(10) Patent No.: US 10,787,757 B2
(45) Date of Patent: Sep. 29, 2020

(54) TAILORED FIBER PLACEMENT UTILIZING FUNCTIONAL THREAD

(71) Applicant: AREVO, INC., Santa Clara, CA (US)

(72) Inventors: Natalie Margaretha Rudolph, Santa Clara, CA (US); Danning Zhang, Sunnyvale, CA (US)

(73) Assignee: AREVO, INC., Milpitas, CA (US)

(*) Notice: Subject to any disclaimer, the term of this patent is extended or adjusted under 35 U.S.C. 154(b) by 111 days.

(21) Appl. No.: 16/113,462

(22) Filed: Aug. 27, 2018

(65) Prior Publication Data

US 2020/0063307 A1 Feb. 27, 2020

(51) Int. Cl.
| | |
|---|---|
| *B32B 5/06* | (2006.01) |
| *D05B 3/22* | (2006.01) |
| *D05B 19/14* | (2006.01) |
| *D05B 19/16* | (2006.01) |
| *D05B 69/18* | (2006.01) |
| *D05B 19/04* | (2006.01) |

(52) U.S. Cl.
CPC .................. *D05B 3/22* (2013.01); *B32B 5/06* (2013.01); *D05B 19/04* (2013.01); *D05B 19/14* (2013.01); *D05B 19/16* (2013.01); *D05B 69/18* (2013.01); *D05D 2303/08* (2013.01); *D10B 2331/021* (2013.01); *D10B 2401/06* (2013.01)

(58) Field of Classification Search
CPC .. B05C 17/00; B32B 5/06; B32B 5/02; B32B 7/00; B29C 70/226; B29C 70/228
See application file for complete search history.

(56) References Cited

U.S. PATENT DOCUMENTS

| | | | | |
|---|---|---|---|---|
| 4,867,086 A | * | 9/1989 | Vees ....................... | B29C 70/22 112/475.04 |
| 7,175,787 B2 | * | 2/2007 | Ebert ...................... | B29C 70/34 156/245 |
| 7,503,273 B2 | * | 3/2009 | Beneventi ............... | B29C 70/48 112/475.04 |

(Continued)

OTHER PUBLICATIONS

Gliesche, Konrad, et al., Application of the tailored fibre place (TFP) process for a local reinforcement on an 'open hole' tension plate from carbon/epoxy laminates, Composites Science and Technology, vol. 63, 2003, pp. 81-88.

(Continued)

*Primary Examiner* — Tajash D Patel
(74) *Attorney, Agent, or Firm* — Botos Churchill Law LLP; Richard J Botos; Sujatha Vathyam

(57) ABSTRACT

The present invention provides a system and method for the application of a functional thread to secure roving or other fibers to a substrate, thereby forming a precursor to a resultant composite component structure having targeted, enhanced structural reinforcement. The functional thread may be comprised of one or more fibrous filaments or have a monofilament structure. The invention encompasses the sewing of this functional thread at varying stitch densities as function of component stress analysis, the mechanical stresses that the component will be subject to when exposed to the forces and loads associated with its intended use, and at least one physical or mechanical property of a functional thread. This variable stitch density serves to provide targeted, localized mechanical enhancement and reinforcement to the resultant composite structure.

8 Claims, 5 Drawing Sheets

(56) References Cited

U.S. PATENT DOCUMENTS

| | | | |
|---|---|---|---|
| 7,942,993 B2* | 5/2011 | Gessler | B29C 70/226 |
| | | | 156/148 |
| 9,656,429 B1 | 5/2017 | Mantha et al. | |
| 2005/0118390 A1* | 6/2005 | Wagner | D04H 3/10 |
| | | | 428/102 |
| 2006/0068150 A1* | 3/2006 | Henrich | B32B 5/06 |
| | | | 428/64.1 |
| 2016/0176154 A1* | 6/2016 | Wittig | C09J 7/21 |
| | | | 428/86 |
| 2017/0246814 A1* | 8/2017 | Schiebel | D01F 8/04 |

OTHER PUBLICATIONS

Killi, S, et al., FEA and 3D Printing, the Perfect Match?, International Journal of Mechanical Systems Engineering, vol. 1, Jan. 9, 2016, pp. 1-7.

Spickenheuer, A, et al., Using tailored fibre placement technology for stress adapted design of composite structures, Plastics and Rubber Composites, vol. 37, Mar. 2008, pp. 227-232.

Zarbakhsh, J, et al., Sub-modeling Finite Element Analysis of 3D Printed Structures, et al 16th International Conference on Thermal, Mechanical and Multi-Physics Simulation and Experiments in Microelectronics and Microsystems, IEEE Explore, May 7, 2015, pp. 1-4.

* cited by examiner

TAILORED FIBER PLACEMENT UTILIZING FUNCTIONAL THREAD

FIELD

The present invention relates generally to the fabrication of composite structures and components, and more specifically to the creation of such structures having targeted areas exhibiting increased mechanical performance, especially shear strength.

BACKGROUND

There are numerous processes and technologies for fabrication of composite structures and components. These include 3-D printing technologies, autoclave curing, out-of-autoclave ("OOA") curing, injection molding, liquid molding and hot pressing. Each of these technologies requires one or more fiber precursors to serve as the basis for the fabricated composite structure.

One technology for creating such precursors is tailored fiber placement ("TFP"). TFP was first developed in the 1990's, enabling the production of arbitrarily-shaped fiber precursors. TFP involves positioning and securing a bundle of fibers, referred to as a roving, upon a base substrate material, to form an integrated precursor for a fiber-reinforced composite structure. Typically, the strength and stiffness of such a fiber-reinforced structure is greatest along the direction in which the component fibers are aligned.

FIG. 1 provides an illustration of the type of equipment typically utilized to perform TFP. As shown, roving 102 is positioned along the surface of substrate 104 (typically a fabric) by the roving pipe 106 of a TFP embroidering system. As roving 102 is fed through roving pipe 106, needle 108, attached to and driven by the sewing head (not illustrated) of the TFP embroidery system, secures roving 102 to substrate 104 by sewing it into position with upper thread 110. This sewing process is similar to that of a standard sewing machine in as much as it involves an upper thread 110 fed through needle 108, and a lower thread (not illustrated), fed in from a bobbin apparatus (not illustrated) located below the substrate.

TFP commercially-available embroidery systems are typically controlled by a microprocessor-based system, with the roving being secured by regularly-spaced stitching in a pre-programmed pattern upon a substrate. One example of such is the ZCW 0100-1375-1200 embroidery system, marketed by ZSK Technical Embroidery Systems of Krefeld, Germany. These systems include a microprocessor-based control system in communication with a memory and a plurality of stepper motors. The system actuates the motors to guide the roving pipe along a pre-programmed three-dimensional (x, y, z) path stored in the system's memory. The roving is then stitched into place in accordance with a pre-programmed three-dimensional (x, y, z) stitching pattern, also stored in the memory. Resin is then applied to bind the fibers of the roving to form a solid composite structure. The roving provides reinforcement of the resulting composite structure.

TFP has proven to be effective for fabricating complex, arbitrarily-shaped composite components, and for providing structural reinforcement of composite structures. The pattern of the roving upon the substrate can be calculated so as to optimize this reinforcement to compensate for localized or directed stresses to which the resulting composite structure may be exposed. Examples of particular methods for performing and optimizing roving placement for structural reinforcement are disclosed in Spickenheuer, A., et al. "Using tailored fibre placement technology for stress adapted design of composite structures," *Plastics and Rubber Composites*, vol. 37, pp. 227-232 (March 2008) and Gliesche, K, et al., "Application of the tailored fibre place (TFP) process for a local reinforcement on an 'open hole' tension plate from carbon/epoxy laminates," *Comp. Sci. and Tech.*, vol. 63, pp. 81-88 (2003), which are incorporated by reference herein.

The thread utilized to secure the roving material to a substrate can be monofilament or multi-filament in nature, similar to types of threads that are typically employed in industrial or commercial sewing applications. The purpose of the thread within the TFP process is to properly secure the roving to the substrate until additional manufacturing processes, such as injection molding, autoclave curing, out-of-autoclave ("OOA") curing, liquid molding and hot pressing, are performed upon the roving/substrate structure, thereby creating a finished product or component. This thread has been viewed as simply a fastening means required to secure the roving which functions to bolster the structural integrity of the finished component. In certain applications, this thread can even be considered detrimental to the integrity of the finished component due to the disruption of the integrity of the substrate as the thread is sewn into it. Consequently, improvements to securing the roving in a TFP process are sought.

BRIEF SUMMARY OF THE INVENTION

The present invention provides a system and method for the application of a functional thread to secure roving or other fibers to a substrate, thereby forming a precursor to a resultant composite component structure having targeted, enhanced structural reinforcement. The functional thread may be comprised of one or more fibrous filaments or have a monofilament structure. The invention encompasses the sewing of this functional thread at varying stitch densities as a function of component stress analysis, the mechanical or stresses that the component will be subject to when exposed to the one or more forces and one or more loads associated with its intended use, and at least one physical or mechanical property of a functional thread. This variable stitch density serves to provide targeted, localized mechanical enhancement and reinforcement to the resultant composite structure.

DESCRIPTION OF THE DRAWINGS

The features, aspects, and advantages of the present invention will become better understood with regard to the following description, appended claims, and accompanying drawings in which:

DETAILED DESCRIPTION

Heretofore, the thread used to attach roving or other fibers to a substrate had one primary function: properly securing the roving in place so that subsequent manufacturing processes could be performed. The thread played no significant role in supplementing the strength/structural integrity of the component being manufactured, or imparting particular electrical, thermal, mechanical or chemical properties or capabilities to the resultant composite structure. The instant invention provides for utilizing a thread made of one or more materials which exhibit particular attributes that will supplement or enhance the component being manufactured. Such attributes include shear strength and tensile strength. Such a thread can be comprised of mono fibers or commingled homogenous fibers or mixed/hybrid fibers comprised of more than one material. Regardless of the particular material or configuration, the thread should exhibit low-elongation, and sufficient strength and abrasion resistance to make it suitable for passing through the eye of an embroidering needle during the sewing process with minimal resistance or fraying. Processes for manufacturing such threads are well-known in the art and will not be discussed here. Suitable fibers for creating such thread include those comprised of glass, aramid, carbon, ultra-high molecular weight polyethylene (UHMWPE), boron, steel, copper, and carbon nanotubes, aluminum, basalt, jute, ramie, nettle, flax, hemp, sisal, or kenaf.

As known in the art, finite element analysis ("FEA") can be applied to perform the structural and stress analysis of a 3-D component structure. See, for example, U.S. Pat. No. 9,656,429 entitled, "Systems and Methods for Structurally Analyzing and Printing Parts" to Chandrashekar, M., et al.; and Zarbakhsh, J., "Sub-modeling Finite Element Analysis of 3D Printed Structures", et al., "$16^{th}$ International Conference on Thermal, Mechanical and Multi-Physics Simulation and Experiments in Microelectronics and Microsystems", *IEEE Explore*, pp. 1-4 (May 7, 2015); and Killi, S., et al, "FEA and 3D Printing, the Perfect Match?", *International Journal of Mechanical Systems Engineering*, Vol. 1, pp. 1-7 (Jan. 9, 2016), all of which are incorporated by reference herein. FEA provides a means for mathematically modeling and analyzing a given 3-D component structure so as to calculate the shear strength of the various sections of the component and calculate the mechanical stresses that will be exerted upon sections of the component when the component is exposed to the forces and loads of a particular application or environment. Mechanical stress as used herein includes one or more mechanical stresses to which a subsection may be subjected.

Figure 2:
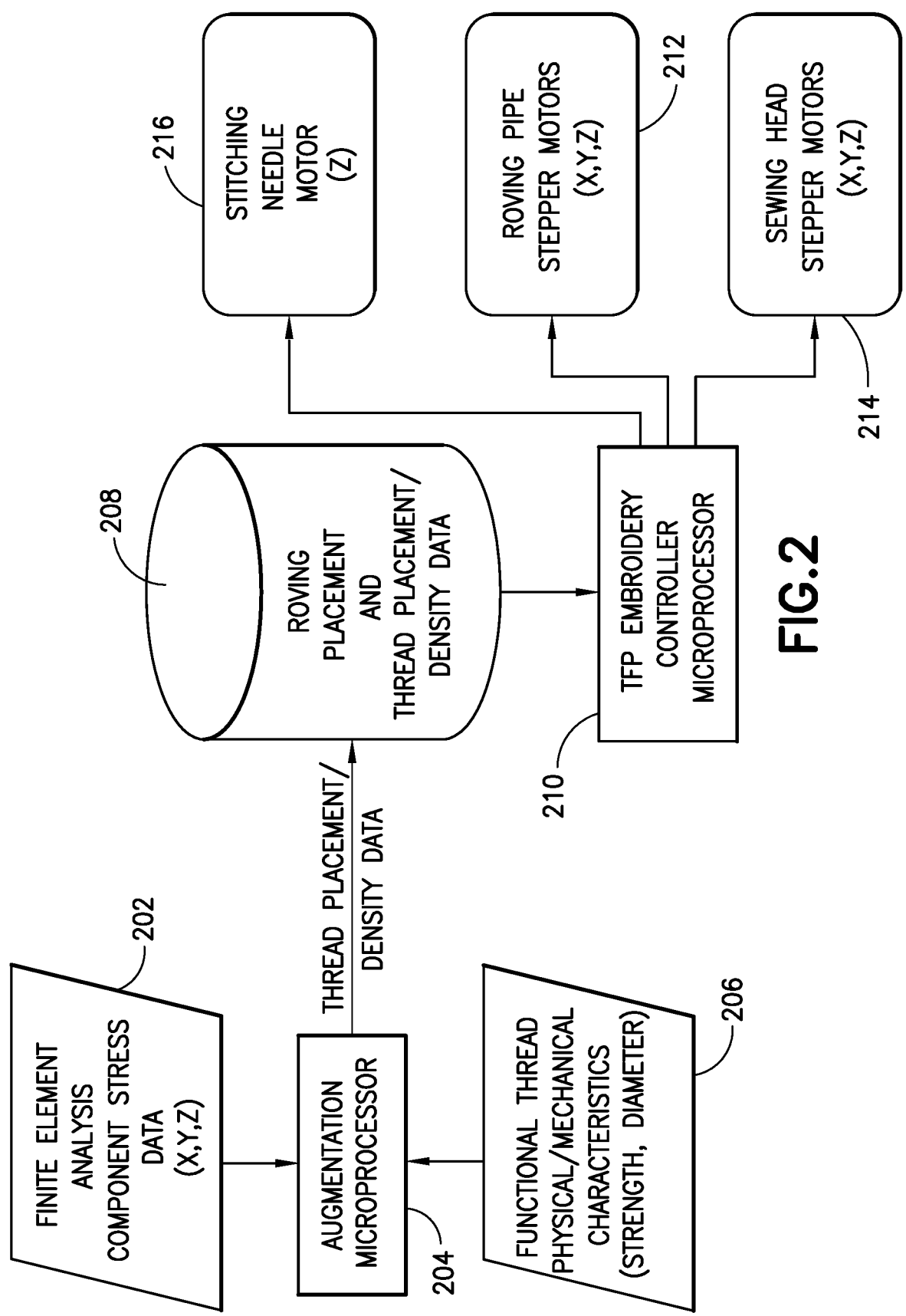
FIG. 2 is a functional block diagram of an exemplary TFP embroidery system adapted to stitch functional thread onto a substrate.

FIG. 2 provides a functional block diagram of a TFP embroidery system adapted to stitch functional thread onto a substrate in accordance with the invention. Data indicative of the strength of various subsections of the component being fabricated and the mechanical stress or stresses that those subsections will be placed under when the component is exposed to the forces and loads of the intended application are stored in FEA memory 202. The types of components typically manufactured using TFP range from blades utilized in industrial compressors, to structural beams found in fixed-wing and helicopter airframes, to bicycle components.

As previously discussed, the application of FEA to derive such data is well-known in the art and will not be discussed in detail. The data from FEA memory 202 is provided to augmentation microprocessor 204 which is programmed to perform a comparative analysis and identify those sections of the component for which the computed mechanical stress is in excess of, or within some predefined range of, the computed shear strength. Upon identifying such sections, augmentation microprocessor 204 calculates the particular functional thread stitching density (the distance between the adjacent stitches traversing the roving) and stitch pattern (the arrangement of the stitching thread along and across the roving; for example, a zigzag stitch) to be applied to the identified regions so as to provide the appropriate shear strength augmentation. This particular stitching density calculated is a function of the physical and mechanical characteristics of the function thread, which are stored in thread memory 206. These characteristics include thread strength, elasticity and diameter. The calculated functional thread placement and stitching density data is then stored in TFP embroidery system memory 208. TFP Embroidery Controller Microprocessor 210 utilizes the calculated functional thread placement and stitching density data, along with other pre-programmed data defining the placement of the roving, to control stepper motors that position the roving pipe (212) and the sewing head (214) in the x, y and z planes, as well as the motor driving the up-down (z plane) movement of the stitching needle (216).

Figure 1:
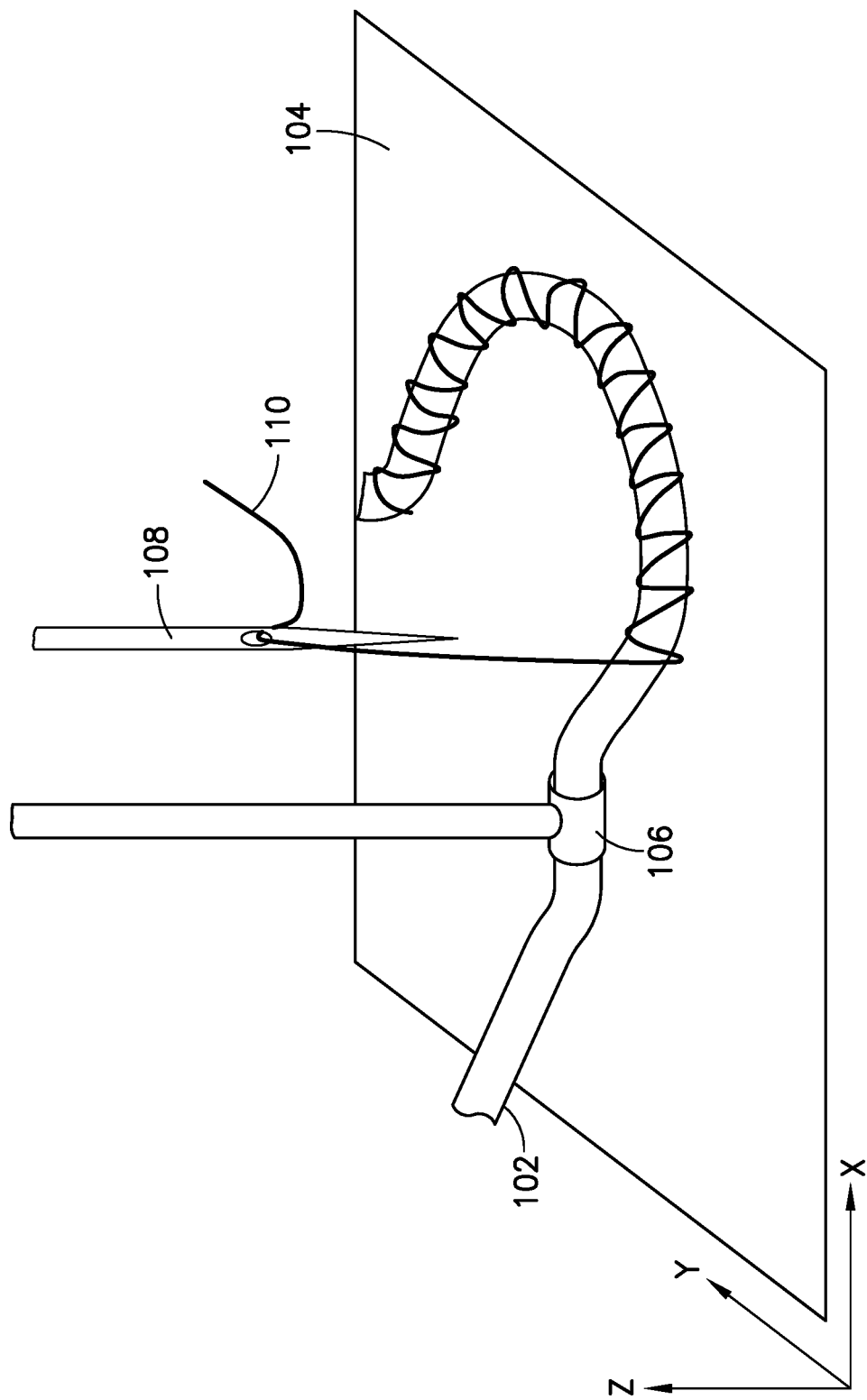
FIG. 1 is a perspective view of equipment typically utilized to perform TFP.
Figure 3:
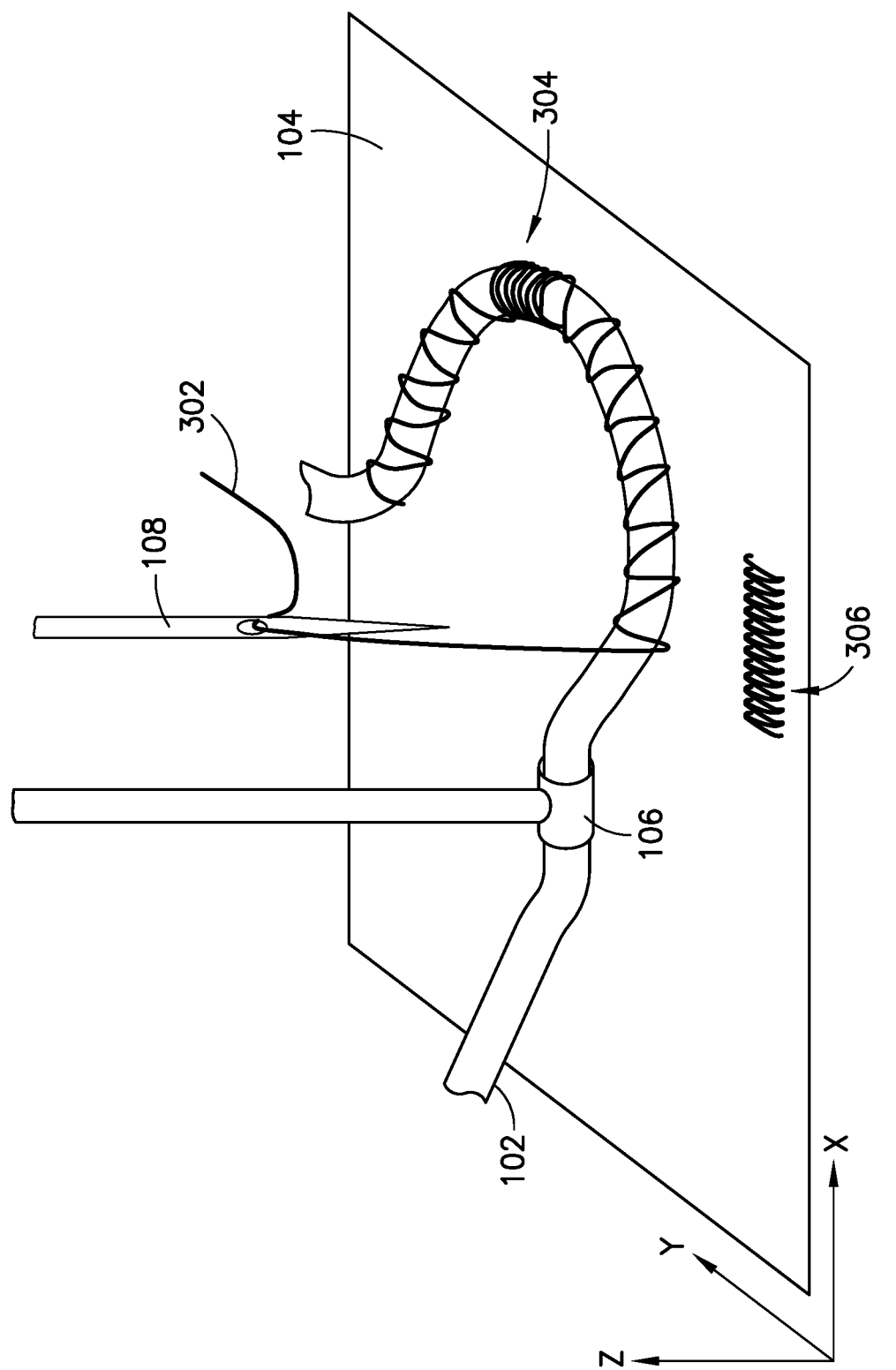
FIG. 3 is a perspective view of a TFP embroidery system adapted to stitch functional thread onto a substrate.

As illustrated in FIG. 3, functional thread 302 is applied by a TFP embroidery system, having a functionality similar to that depicted in FIG. 2. Roving 102 is fed through roving pipe 106, and needle 108 of the TFP embroidery system secures roving 102 to substrate 104 with functional thread 302. As with the system of FIG. 1, the sewing process is similar to that of a standard sewing machine, utilizing an upper functional thread 302 fed through needle 108, and a lower functional thread (not illustrated), fed in from a bobbin apparatus (not illustrated) located below the substrate.

In this particular embodiment functional thread 302 is an aramid fiber exhibiting a high modulus and strength. Consequently, the functional thread 302 stitching securing roving 102 will augment the shear strength of the resultant composite structure. An FEA analysis of the component being fabricated in FIG. 3 revealed that the area of the component labeled 304 would be subject to a shear force in excess of the calculated shear strength attributable to the composite structure resulting from the resin, roving and standard density functional stitching. Based upon the functional thread physical and mechanical characteristics stored thread memory 206, a determination that a stitching density (approximately four times as dense as the normal stitching density utilized to secure roving 102) would provide the needed shear strength augmentation to area 304. The data reflecting such was stored in TFP embroidery system memory 208 and TFP embroidery controller microprocessor 210 responsively generated the appropriate control signals to sew the high-density functional thread to secure the appropriate section (304) of roving.

The functional thread 302 could also be stitched directly into the substrate 104, without the attachment of a roving (306 of FIG. 3). This direct stitching would provide localized strengthening of the resultant composite structure, if a FEA analysis determined it was needed. Direct functional thread stitching could be employed on the substrate in regions corresponding to areas of the resultant composite structure with dimensional restrictions that make the application of a roving impractical.

Figure 4A:
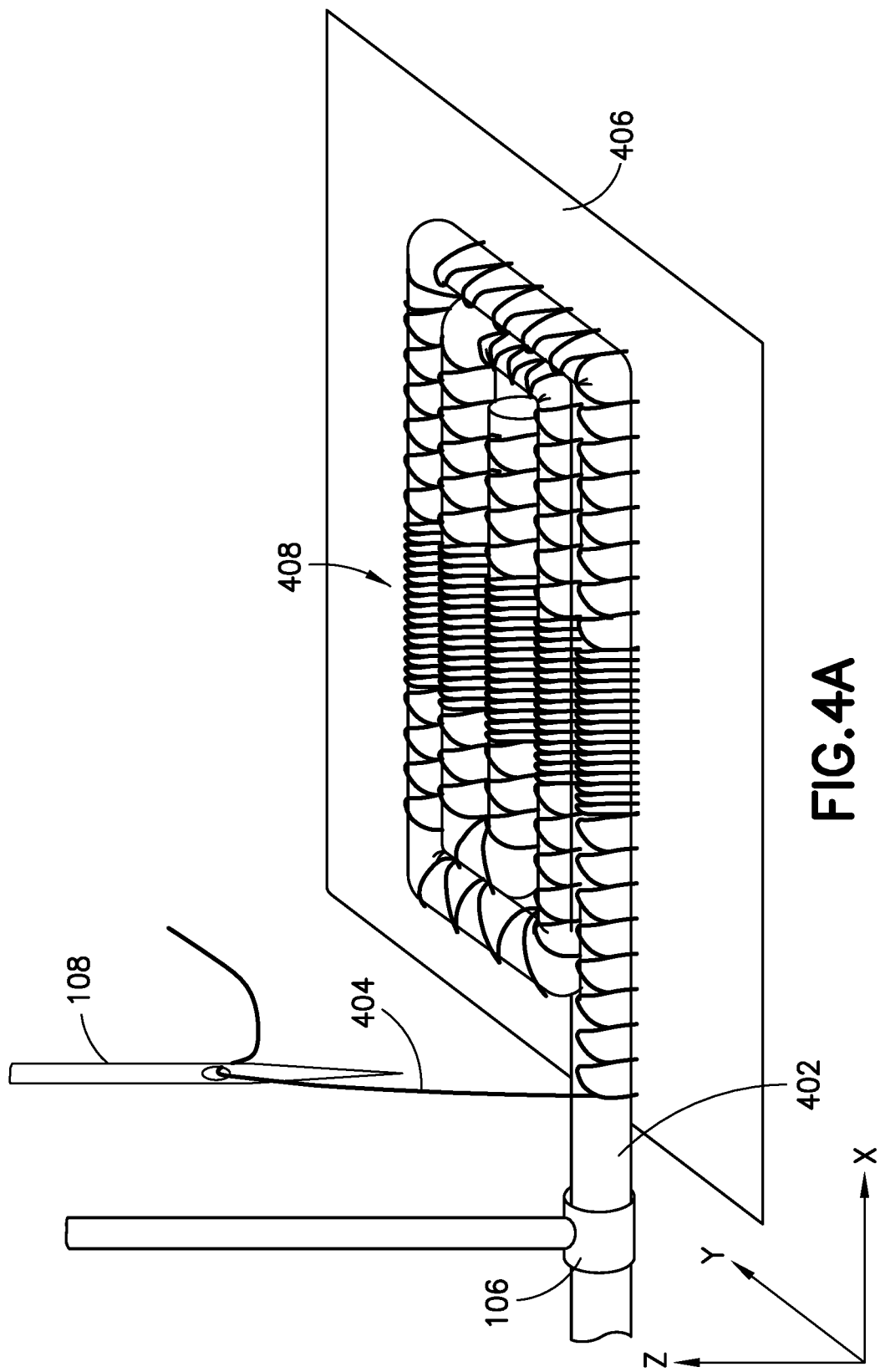
FIG. 4A and FIG. 4B are perspective views of the TFP embroidery system of FIG. 2 performing the stitching of a second layer of roving onto a substrate.
Figure 4B:
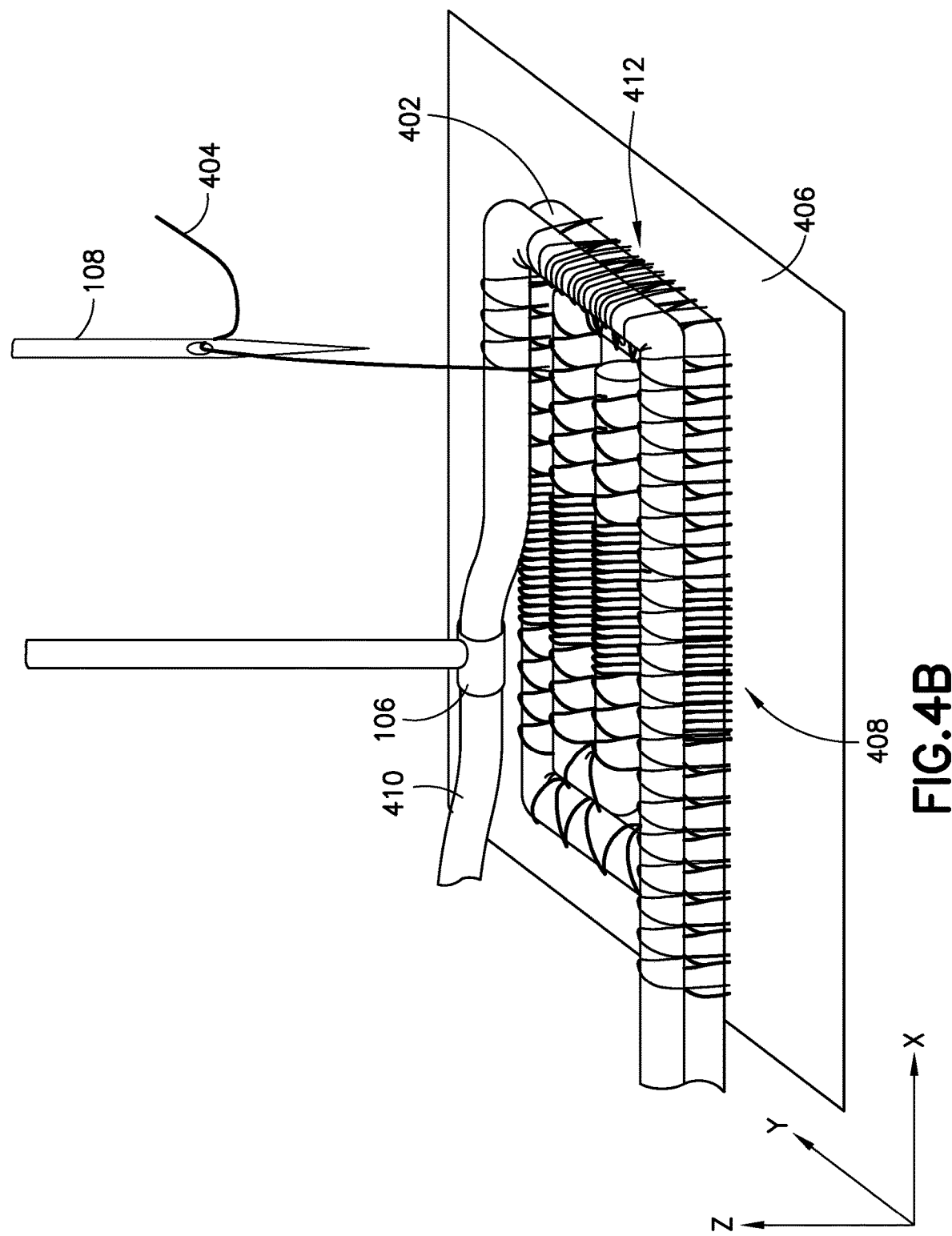

FIG. 4A and FIG. 4B show an embodiment where multiple layers of roving are secured to a substrate utilizing the invention. As shown in FIG. 4A, a first layer of roving 402 has been fed through and positioned by roving pipe 106 and stitched with functional thread 404 onto substrate 406 by needle 108 to form a rectangular pattern. As with the embodiment depicted in FIG. 3, the functional thread utilized here exhibits a high strength and modulus, making it resistant to shearing. FEA analysis indicated that an increased stitching density in region 408 was required to augment the strength of this layer of the component being fabricated.

FIG. 4B depicts roving 410, fed through and positioned by roving pipe 106 so as to provide a second layer of roving upon a portion of the perimeter of the previously secured roving rectangle. FEA analysis indicated that an increased stitching density in region 412 of the second layer of roving was required to augment the strength of the component being fabricated. As shown, the embroidery system has created a region of increased stitching density (412), augmenting the strength of that region.

By utilizing multiple levels of roving, each secured with a particular density and pattern of functional thread stitching, responsively applied as a function of FEA analysis and the physical and mechanical properties of the functional threading, the invention provides a system and method for target and tailoring the augmentation of particular properties, three-dimensionally, within a fabricated fiber component. Although the invention herein has been described with reference to particular embodiments, it is to be understood that these embodiments are merely illustrative of the principles and applications of the present invention. For example, more than two layers of roving could be secured to a given substrate. An alternate process for calculating the structural and stress analysis of a 3-D component structure, such as boundary element, discrete element, finite difference, or other computer-aided methodologies. It is therefore to be understood that numerous modifications may be made to the illustrative embodiments and that other arrangements may be devised without departing from the spirit and scope of the present invention as defined by the appended claims.

What is claimed is:

1. A system for applying a functional thread to a tailored fiber placement component precursor comprising:
   a component stress analysis memory storing data indicative of a strength of at least one subsection of the tailored fiber placement component being fabricated and a mechanical stress that the at least one subsection of the tailored fiber placement component will be subject to when the tailored fiber placement component is exposed to one or more forces and one or more loads associated with an intended use of the tailored fiber placement component;
   a functional thread characteristic memory storing data indicative of at least one physical or mechanical property of a functional thread;
   an augmentation processor adapted to perform a comparative analysis utilizing the data stored in the component stress analysis memory; and
   a microprocessor-controlled embroidery system adapted to position at least one layer of roving upon a substrate in accordance with a predefined pattern, and to secure to the substrate a portion of the roving corresponding to the at least one subsection of the tailored fiber placement component with a stitching of the functional thread, wherein the functional thread has a stitch density which is determined as a function of the comparative analysis and the data stored in the functional thread characteristic memory.

2. The system of claim 1, wherein finite element analysis is utilized to compute the data indicative of the strength of the at least one subsection of the tailored fiber placement component being fabricated and the mechanical stress that the at least one subsection of the tailored fiber placement component will be subject to when the tailored fiber placement component is exposed to the one or more forces and the one or more loads associated with the intended use of the tailored fiber placement component.

3. The system of claim 1, wherein the microprocessor-controlled embroidery system is adapted to independently position a roving pipe and a sewing head in three-dimensions as a function of the predefined pattern and the determined stitch density.

4. The system of claim 3, wherein the embroidery system further controls a speed at which a needle stitches the functional thread to secure to the substrate the portion of the roving corresponding to the at least one subsection of the tailored fiber placement component, wherein a rate at which one or more individual stitches are executed is controlled as a function of the comparative analysis and the data stored in the functional thread characteristic memory.

5. A method for applying a functional thread to a tailored fiber placement component precursor comprising:
   computing a strength of at least one subsection of the tailored fiber placement component being fabricated;
   computing a mechanical stress that the at least one subsection of the tailored fiber placement component will be subject to when the tailored fiber placement component is exposed to one or more forces and one or more loads associated with an intended use of the tailored fiber placement component;
   determining at least one physical or mechanical property of a functional thread;
   performing a comparative analysis between the computed strength of the at least one subsection of the tailored fiber placement component and the mechanical stress that the at least one subsection of the tailored fiber placement component will be exposed to;
   computing a stitch density of the functional thread, based upon the at least one physical or mechanical property and the comparative analysis, to augment the strength of the at least one subsection of the tailored fiber placement component; and
   controlling an embroidery system to position at least one layer of roving upon a substrate in accordance with a predefined pattern, and to secure to the substrate a portion of the roving corresponding to the at least one subsection of the tailored fiber placement component with a stitching of the functional thread, wherein the stitch density of the functional thread is equal to the computed stitch density.

6. The method of claim 5, wherein finite element analysis is utilized to compute the strength of at least one subsection of the tailored fiber placement component being fabricated and the mechanical stress that the at least one subsection of the tailored fiber placement component will be subject to when the tailored fiber placement component is exposed to the one or more forces and the one or more loads associated with the intended use of the tailored fiber placement component.

7. The method of claim 5, wherein the embroidery system is adapted to independently position a roving pipe and a sewing head in three-dimensions as a function of the predefined pattern and the computed stitch density.

8. The method of claim 7, wherein controlling the embroidery system further comprises controlling a speed at which a needle stitches the functional thread to secure to the substrate the portion of the roving corresponding to the at least one subsection of the tailored fiber placement component, wherein a rate at which one or more individual stitches are executed is controlled as a function of the at least one physical or mechanical property and the comparative analysis.

* * * * *